United States Patent [19]
Kuo et al.

[11] Patent Number: 4,891,281
[45] Date of Patent: Jan. 2, 1990

[54] ELECTROCHEMICAL CELLS HAVING LOW VAPOR PRESSURE COMPLEXED SO₂ ELECTROLYTES

[75] Inventors: Han C. Kuo, Burlington; Donald L. Foster, Somerville, both of Mass.

[73] Assignee: Duracell Inc., Bethel, Conn.

[21] Appl. No.: 830,231

[22] Filed: Feb. 13, 1986

Related U.S. Application Data

[63] Continuation of Ser. No. 405,980, Aug. 9, 1982, abandoned.

[51] Int. Cl.⁴ .................. H01M 4/36; H01M 6/14
[52] U.S. Cl. ...................... 429/105; 429/196; 429/197; 429/213; 429/220
[58] Field of Search ............... 429/196, 197, 105, 213, 429/220

[56] References Cited

U.S. PATENT DOCUMENTS 3,985,573  10/1976  Johnson ............................ 429/133

FOREIGN PATENT DOCUMENTS 2079744  11/1971  France .

Primary Examiner—Stephen J. Kalafut
Attorney, Agent, or Firm—Ronald S. Cornell; James B. McVeigh

[57] ABSTRACT

A non-aqueous electrochemical cell having a solid active cathode, an active metal anode and a low vapor pressure highly conductive electrolyte comprising a liquid solvate-complex of sulfur dioxide ($SO_2$) and an alkali or alkaline earth metal salt soluble therein such as those having a Group 3A element halide anion with the ratio of salt to $SO_2$ in said electrolyte ranging from about 1:1 to 1:7.

12 Claims, 3 Drawing Sheets

ELECTROCHEMICAL CELLS HAVING LOW VAPOR PRESSURE COMPLEXED SO$_2$ ELECTROLYTES

This application is a continuation of application Ser. No. 405,980, filed Aug. 9, 1982, now abandoned.

This invention relates to electrolytes for non-aqueous electrochemical cells and more particularly to such electrolytes containing sulfur dioxide (SO$_2$).

Sulfur dioxide, though a poor electrolyte solvent has nevertheless been widely utilized in non-aqueous electrochemical cells in the dual function of cathode depolarizer and electrolyte solvent because of its high energy density and high rate capability. Without its functioning as the cathode depolarizer SO$_2$ has rarely been utilized as an electrolyte solvent alone since in addition to its poor solvating properties SO$_2$ has several other shortcomings which are generally related to its being a gas at room temperature and pressure (B.P. 10° C.). For proper utilization the gaseous SO$_2$ is converted into a liquid under conditions of low temperature and/or high pressure and must be maintained in such liquid form by constant pressurization. As a result, cells having SO$_2$ therein have had the attendant disadvantage of requiring expensive reinforced cell containers and hermetic seals resistant to the volatile SO$_2$. Additionally, expense was further incurred as a result of the need for the initial liquefaction of the SO$_2$ and the special handling required particularly with respect to the filling of the cells with the volatile liquid SO$_2$. The safety aspects of cells containing SO$_2$ were also somewhat of a problem since required safety venting mechanisms, while providing protection, nevertheless operated by the atmospheric expulsion of noxious gaseous SO$_2$.

In order to aid in electrolyte solvation and to reduce the high vapor pressure of the SO$_2$, cells have generally contained organic cosolvents such as acetonitrile with the SO$_2$. However, despite the presence of the vapor pressure reducing organic cosolvents, the cells nevertheless remained highly pressurized with its attendant disadvantages. Furthermore, organic cosolvents such as the aforementioned acetonitrile generally precluded efficient cell cycling and occasionally in themselves posed potential saftey problems when the cells were abused. Electrolyte salts which were found to readily dissolve in the SO$_2$ without the necessity for organic cosolvents either provided poorly operating cells e.g. LiAlCl$_4$ or were generally prohibitively expensive e.g. clovoborate salts such as Li$_2$B$_{10}$Cl$_{10}$. Furthermore, such salts when dissolved in the liquified SO$_2$ though alleviating hazard problems associated with organic co-solvents did not alleviate the problems caused by the high vapor pressure of the sulfur dioxide.

It is an object of the present invention to provide a non-aqueous cell having a low vapor pressure electrolyte based upon SO$_2$ and a method for the preparation of such electrolyte.

It is a further object of the present invention to provide such electrolyte having a very high conductivity and thus being suitable for high rate applications; being economical with respect to both component materials annd the preparation thereof; being a liquid at normal temperature and pressure; being chemically stable in non-aqueous cell environments; being suitable for secondary or rechargeable cell applications; being suitable as an electrolyte over a wide temperature range; and being without free organic materials and therefore being safer than conventional organic electrolytes.

These and other objects, features and advantages of the present invention will become more evident from the following discussion and drawings in which:

FIG. 5 also depicts a charging curve for one embodiment.

Figure 2:
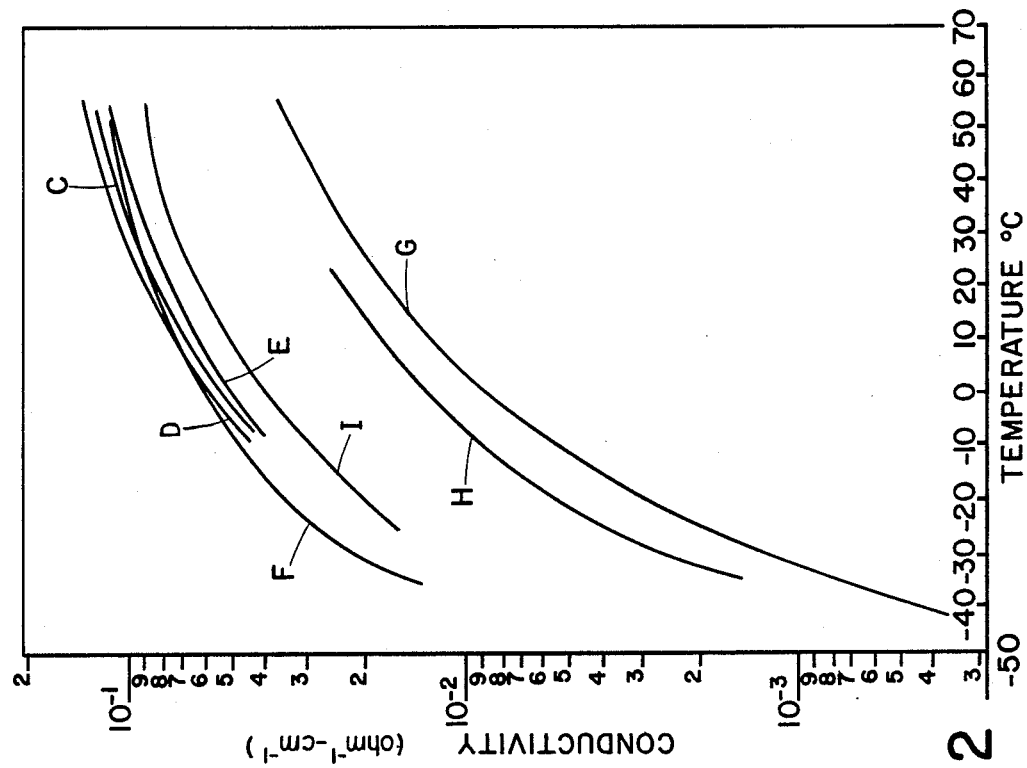
FIG. 2 is a graph of the conductivities of various electrolytes of the present invention at various temperatures.

Generally the present invention comprises a low vapor pressure (below 2 atm at room temperature and preferably below 1 atm) high conductivity electrolyte based upon SO$_2$; a method for the preparation thereof; and both non-aqueous primary and secondary cells having active metal anodes such as of alkali or alkaline earth metal including mixtures and alloys thereof and containing such low vapor pressure electrolyte. The electrolyte of the present invention is comprised of a tightly bound solvate-complex of SO$_2$ and an alkali or alkaline earth metal salt soluble therein such as those wherein the anion of the salt is comprised of a Group 3A (of the Periodic Table) element halide. The Group 3A elements which are preferred for the salt are boron, aluminum, gallium and indium and the preferred alkali and alkaline earth metals are lithium, sodium and calcium. Examples of preferred Group 3A salts suitable for complexing with the SO$_2$ include LiAlCl$_4$, LiGaCl$_4$, LiBF$_4$, LiBCl$_4$, LiInCl$_4$, NaAlCl$_4$, NaGaCl$_4$, NaBF$_4$, NaBCl$_4$, NaInCl$_4$, Ca(AlCl$_4$)$_2$, Ca(GaCl$_4$)$_2$, Ca(BF$_4$)$_2$ Ca(BCl$_4$)$_2$, Ca(InCl$_4$)$_2$, Sr(AlCl$_4$)$_2$, Sr(GaCl$_4$)$_2$, Sr(BF$_4$)$_2$, Sr(BCl$_4$)$_2$, Sr(InCl$_4$)$_2$ and mixtures thereof. Non-Group 3A salts suitable for complexing with the SO$_2$ include Li$_3$SbCl$_6$ and LiSbCl$_6$. Salts which do not complex with the SO$_2$ may however be dissolved in the solvate-complex if desired.

The solvate-complexing of the SO$_2$ and the salt is dependent upon equivalent ratios of the materials rather than mole ratios with such difference being apparent with respect to, for example, alkaline earth metal salts which generally contain two equivalents per mole. The equivalent ratios range from about 1:1 to 1:4 (salt:SO$_2$) and because of such variation the combination of the salt and SO$_2$ is demonstrated as being in the nature of a complex rather than a reaction-formed new compound. Though the actual complexing of the salt to SO$_2$ is generally up to a ratio of 1:4 (salt:SO$_2$), addition of uncomplexed SO$_2$ to the cell in an amount of up to about 1:7 (salt:total SO$_2$) will not generally detrimentally pressurize the cell at room temperature. With salt to SO$_2$ ratios above 1:7 not only does the cell become detrimentally pressurized (above about 2 atm.), the conductivity of the electrolyte is also reduced thereby. Electrolytes such as the 1 molar LiAlCl$_4$ in SO$_2$ (equivalent ratio of about 1:22 of LiAlCl$_4$:SO$_2$) as described in U.S. Pat. No. 3,493,433 are highly pressurized (about 3.5 atm.) and are in fact described in said patent as being utilized at temperatures between −10° C. to −30° C. Because of its being in unavailable complexed form with only a minimal, if any, content of uncomplexed $SO_2$, the $SO_2$ in the electrolyte does not function as the active cathode depolarizer. The electrolyte of the present invention therefore has its main utility in electrochemical cells having solid cathode depolarizers. Such cathodes include $CuCl_2$, $CuO$, $CuS$, $MnO_2$, $Cr_3O_8$, $V_2O_5$ as well as other metal halides, oxides, chromates, vanadates, titanates, tungstates, chalcogenides and active non-metal cathodes such as organic conductive polymers such as polyacetylene, poly-p-phenylene, polyphenylene sulfide and various carbon compounds such as $C_xS$ and $CF_n$.

Though it would have been expected that the solid cathodes would provide cells having reduced high rate capability when compared to cells having fluid cathode depolarizers such as $SO_2$ such reduction is in fact minimized by the unexpectedly very high conductivity of the electrolyte of the present invention. Furthermore, advantages of a substantially non-pressurized system, particularly with respect to increased safety more than compensates for any reduction in high rate capability.

Figure 1:
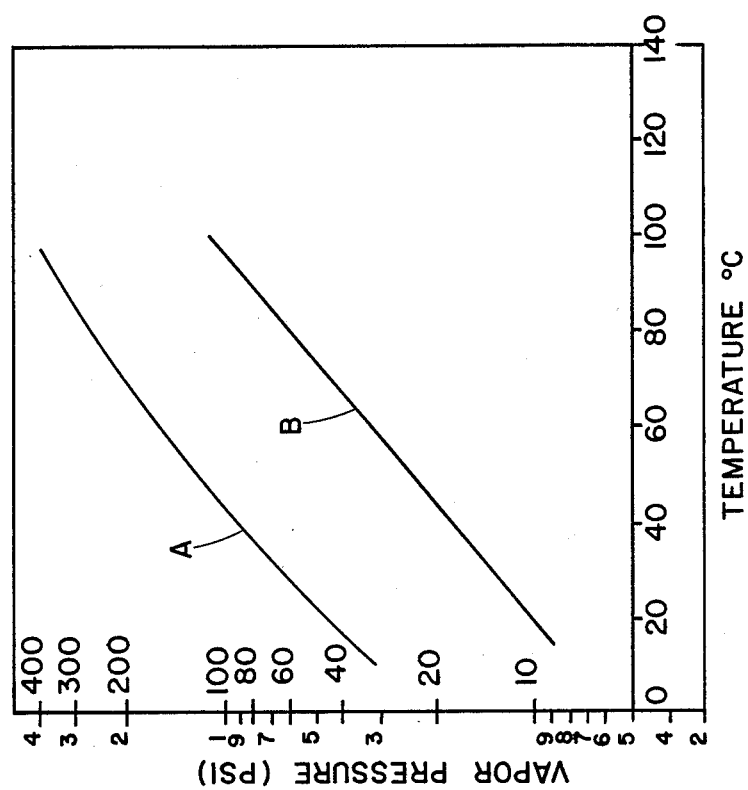
FIG. 1 is a vapor pressure comparison of a prior art SO$_2$ electrolyte and an electrolyte of the present invention.

The solvate-complex electrolyte of the present invention is prepared by reacting the $SO_2$ with the alkali or alkaline earth metal salt in the requisite equivalent ratios. Such reaction may be effected by substantially saturating liquified $SO_2$ with the salt to the requisite equivalent ratios. It is however preferred that the salt be reacted with the $SO_2$ in gaseous form such as by passing a stream of dry $SO_2$ through the salt whereby an exothermic reaction occurs with the formation of a liquid solvate-complex. The resultant liquid has a low vapor pressure (<10 psi at 20° C. with a B.P. of about 40° C.) and can be handled as a liquid in contrast to liquified $SO_2$ (B.P. 10° C.) which must be specially handled as a volatile material. FIG. 1 compares the vapor pressure of prior art $SO_2$ containing electrolyte (Curve A) and a $LiAlCl_4.3.5SO_2$ solvate-complex (Curve B) at various temperatures. At room temperature (20° C.) prior art $SO_2$ electrolytes have high vapor pressures (about 50 psi or about 3½ atm) whereas the solvate-complex has a vapor pressure of about 10 psi, well below atmospheric pressure of 15 psi. Pressure rise of the solvate-complex electrolyte is logarithmical with a rise in temperature to a pressure of 60 psi at 80° C. This is in further marked contrast to the 260 psi at 80° C. of the prior art $SO_2$-containing electrolytes.

It is noted that the $SO_2$ need not be directly reacted with the salt per se but may in fact be reacted with for example the Lewis acid and base components of the salt whereby the salt and the liquid solvate-complex are simultaneously produced. For example, a stream of dry $SO_2$ may be passed through a $LiAlCl_4$ salt or a 1:1 stoichiometric mixture of the Lewis acid and base components thereof, $LiCl$ and $AlCl_3$, to produce the same liquid $LiAlCl_4.xSO_2$ solvate-complex, with "x" having been determined as ranging from about 1 to 4 (equivalent basis). Continued bubbling of $SO_2$ therethrough results in a higher value for "x" in the range. Lower values for "x" may be obtained by evaporating some of the $SO_2$ from the liquid solvate-complex. Addition of excessive $SO_2$ as described above wherein the ratio of total $SO_2$ to salt exceeds 7:1, however, forms an undesirable pressurized (above about 2 atm) electrolyte.

The conductivity at room temperature of a solvate-complex electrolyte of $LiAlCl_4.3.5SO_2$ has been discovered to be about $1 \times 10^{-1}$ $ohm^{-1}cm^{-1}$ which is the highest conductivity observed to date in any non-aqueous electrolyte. The electrolyte of the present invention has been found to be very stable with lithium anodes and has been further found to enable lithium to be electrochemically plated and stripped therein with efficiencies of over 97% even over extended cycling regimens whereby it is an eminently suitable electrolyte for rechargeable lithium or other alkali or alkaline earth metal cells.

A solvate-complex of $NaAlCl_4.2.8SO_2$ while having somewhat lower conductivity of $8 \times 10^{-2}$ $ohm^{-1}cm^{-1}$ (but still very high) has the advantage of good low temperature operability e.g. conductivity of $2 \times 10^{-2}$ $ohm^{-1}cm^{-1}$ even at $-30°$ C. In contrast to the $LiAlCl_4.xSO_2$ solvate-complexes which freeze at temperatures between about $-8°$ C. to $-15°$ C. the $NaAlCl_4.xSO_2$ solvate-complexes freeze at about $-44°$ C. and are more suitable when low temperature operation is desired. A solvate-complex of $Ca(AlCl_4.2.7-5SO_2)_2$ which has a conductivity of $1.7 \times 10^{-2}$ $ohm^{-1}cm^{-1}$ at room temperature and about $10^{-3}$ $ohm^{-1}cm^{-1}$ at $-35°$ C. does not in fact freeze but rather becomes immobile at about $-50°$ C. It can accordingly be admixed with other solvate-complex salts such as $LiAlCl_4.3.5SO_2$ to provide an electrolyte having both high conductivity and extremely low and high temperature capability.

Alternatively, it has been discovered that the incorporation of additive amounts of inorganic solvents such as $SOCl_2$, $S_2Cl_2$, $SCl_2$, $SO_2Cl_2$ admixtures thereof to the solvate-complex electrolyte also serves to enhance low temperature capability. For example, a mixture of 90% (by weight) $LiAlCl_4.2.7SO_2$ and 10% $SOCl_2$ (containing 1M $LiAlCl_4$) freezes at about $-25°$ C. with a conductivity of about $1.8 \times 10^{-2}$ $ohm^{-1}cm^{-1}$ at $-20°$ C.

Though lithium has been found to be stable in the presence of, for example, the $NaAlCl_4$ and $Ca(AlCl_4)_2$ solvate-complex electrolytes, in secondary or rechargeable cell applications it is preferred that the complexed salt contains cations corresponding to the anode metal.

For primary cell applications other salts such as the aforementioned sodium and calcium salts may be affectively utilized with lithium anodes particularly in providing enhanced low temperature capability. Additionally and preferably for primary cell applications electrolyte salts normally not soluble in $SO_2$ alone may be utilized by stoichiometric complexing with both $SO_2$ and an organic cosolvent such as acetonitrile; ethers such as dimethoxyethane; propylene carbonate and the like. Such salts include $LiBr$, $LiClO_4$, $LiAsF_6$ and $LiPF_6$. The organic cosolvent thereby make such salts soluble in the $SO_2$. The organic cosolvent is present only in sufficient quantity to co-complex the salt with the hazards of free organic materials not being present. Soluble salts may similarly be utilized with such cocomplex.

The fact that the electrolyte of the present invention has a low vapor pressure despite its $SO_2$ component results in several very important economic and safety benefits. Cells made therewith need not be reinforced or otherwise made resistant to pressurized contents. Venting, if at all necessary as a safety precaution does not result in the emission of rapidly spreading noxious $SO_2$ fumes. Hermetic seals for the cells are not as susceptible to degradation because of the bound state of the normally corrosive $SO_2$ and in fact more economical seals suitable for non-pressurized cells may be utilized. Except for the initial relatively simple procedure of forming the liquid solvate-complex electrolyte as described above no special handling or storage is required in contrast to the handling of uncomplexed volatile $SO_2$. Filling of cells with the electrolyte is simply with a stable liquid as opposed to filling cells with a volatile pressurized liquid such as SO$_2$.

In order to more fully illustrate the properties and beneficial aspects of the electrolyte of the present invention the following examples are presented. It is understood, however, that such examples are illustrative in nature and are not to be construed as limiting the present invention. Unless otherwise indicated all parts are parts by weight.

EXAMPLE 1

Stoichiometric amounts of LiCl and AlCl$_3$ were placed in a glass vessel and dry SO$_2$ was passed through the salt particles. A clear liquid solvate-complex of LiAlCl$_4$.SO$_2$ was formed rapidly with the generation of heat and after cooling to room temperature the molar or equivalent ratio of LiAlCl$_4$ to SO$_2$ in the solvate-complex was determined to be 1:3.1. Continued bubbling of the dry SO$_2$ through the LiCl and the AlCl$_3$ provided another clear liquid solvate-complex having an equivalent ratio of LiAlCl$_4$ to SO$_2$ of 1:3.5. Evaporation of some SO$_2$ from the LiAlCl$_4$.3.1SO$_2$ solvate-complex provided another clear liquid solvate-complex having an equivalent ratio of LiAlCl$_4$ to SO$_2$ of 1:2.6. The conductivities of the three liquid solvate-complexes at various temperatures were measured as shown in FIG. 2 as curves C, D and E respectively. The conductivities obtained were the highest ever obtained for nonaqueous electrolytes. Additionally, lithium metal stored in the electrolytes for periods in excess of four weeks showed no corrosion thereby indicating the stability of such solvate-complex electrolytes in lithium containing cells.

EXAMPLE 2

A NaAlCl$_4$.2.8SO$_2$ solvate-complex was formed as in Example 1 but with NaCl instead of LiCl with its conductivity at various temperatures shown in FIG. 2 as Curve F.

EXAMPLE 3

A Ca(AlCl$_4$.2.75SO$_2$)$_2$-equivalent ratio (Ca(AlCl$_4$)$_2$.5.5SO$_2$ molar ratio) solvate-complex was formed as in Example 1 but with a stoichiometric ratio of CaCl$_2$:2AlCl$_3$. The conductivity at various temperatures is shown in FIG. 2 as Curve G.

EXAMPLE 4

A mixed solvate complex of (LiAlCl$_4$+4Ca(AlCl$_4$)$_2$).5.6SO$_2$ (molar ratio) was made by passing SO$_2$ through AlCl$_3$, LiCl and CaCl$_2$ (molar ratio of 9:1:4). The resultant liquid solvate-complex provided conductivities at various temperatures as shown in FIG. 2 as Curve H.

EXAMPLE 5

A mixture of 90% LiAlCl$_4$.2.7SO$_2$ solvate-complex and 10% 1M LiAlCl$_4$ in SOCl$_2$ was made and provided conductivities at various temperatures as shown in FIG. 2 as Curve I.

EXAMPLE 6

Figure 3:
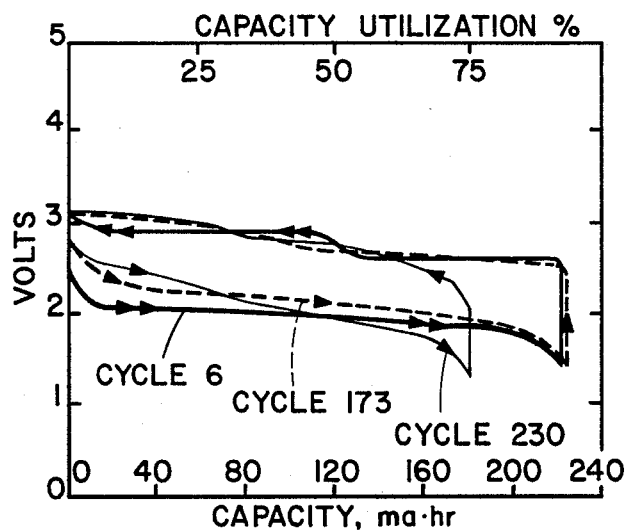
FIG. 3 is a graph of the cycling characteristics of a cell having the electrolyte of the present invention.

A cathode limited electrochemical cell was constructed with a 2 gram cathode of 60% CuCl$_2$, 30% graphite and 10% polytetrafluoroethylene (PTFE) pressed on a nickel grid, 1" (2.5 cm)×1.6" (4.1 cm) sandwiched by two lithium anodes each of similar dimensions. The cell was filled with the LiAlCl$_4$.3.1SO$_2$ solvate-complex electrolyte of Example 1 and discharged at the rate of 40 ma (2 ma/cm$^2$) to a 2.6 volt cutoff and charged at a rate of 20 ma (1 ma/cm$^2$) to 4.05 volts on a continuous cycling regimen. The cell has cycled for about 350 cycles at close to 100% of the one electron transfer cathode capacity (Li+CuCl$_2$→CuCl+LiCl). The charging and discharging curves for cycles nos. six, 173 and 230 are shown in FIG. 3. Cumulative capacity so far is 72 Ahrs with about 36 Li turnovers (97% eff. on the anode). The initial theoretical primary capacity was 0.24 Ahr.

EXAMPLE 7

Figure 4:
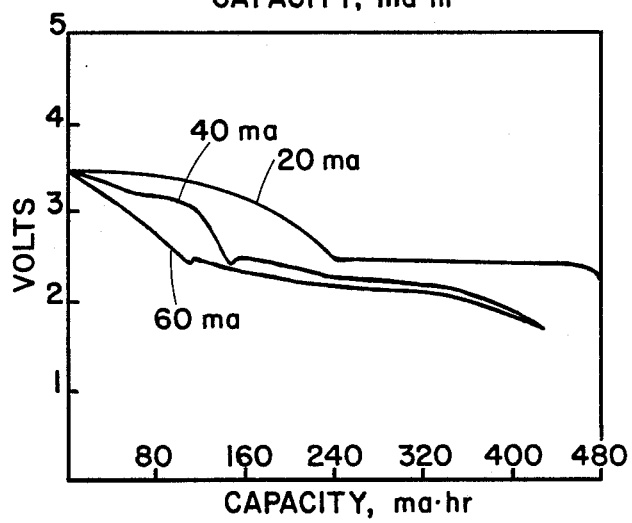
FIGS. 4–7 are discharge curves of various cells having the electrolyte of the present invention.

Three cells were made as in Example 6 but with the solvate-complex electrolyte, (LiAlCl$_4$+4Ca(AlCl$_4$)$_2$).5.6SO$_2$ of Example 4. The cells were discharged at rates of 20 ma, 40 ma and 60 ma respectively with discharge results as shown in FIG. 4.

EXAMPLE 8

Figure 5:
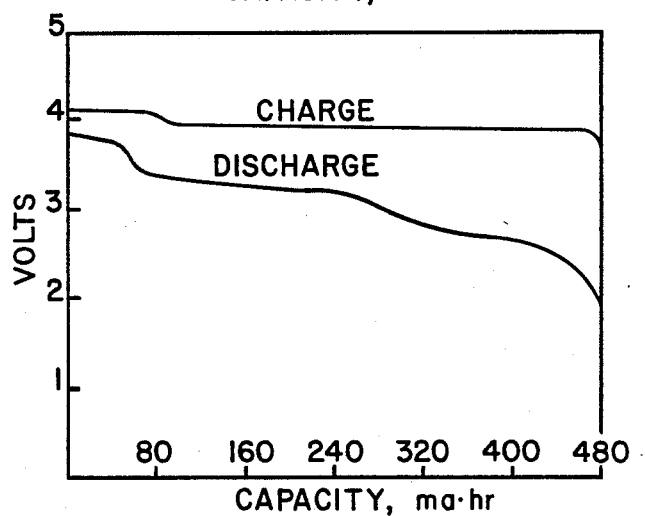

A cell as in Example 6 was made but with the solvate complex electrolyte of Example 5 (90% LiAlCl$_4$.2.7SO$_2$ and 10% 1M LiAlCl$_4$ in SOCl$_2$). The cell was cycled at 40 ma (2 ma/cm$^2$) discharge 20 ma (1 ma/cm$^2$) charge and the discharge-charge of the sixth cycle is shown in FIG. 5.

EXAMPLE 9

Figure 6:
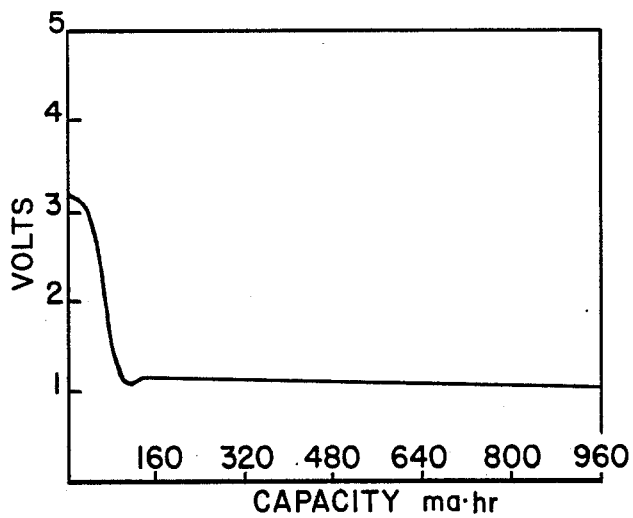

A cell as in Example 6 was made but with a 3 gram cathode comprised of 60% CuO, 30% graphite and 10% PTFE. The cell was discharged at 40 ma with results as shown in FIG. 6.

EXAMPLE 10

Figure 7:
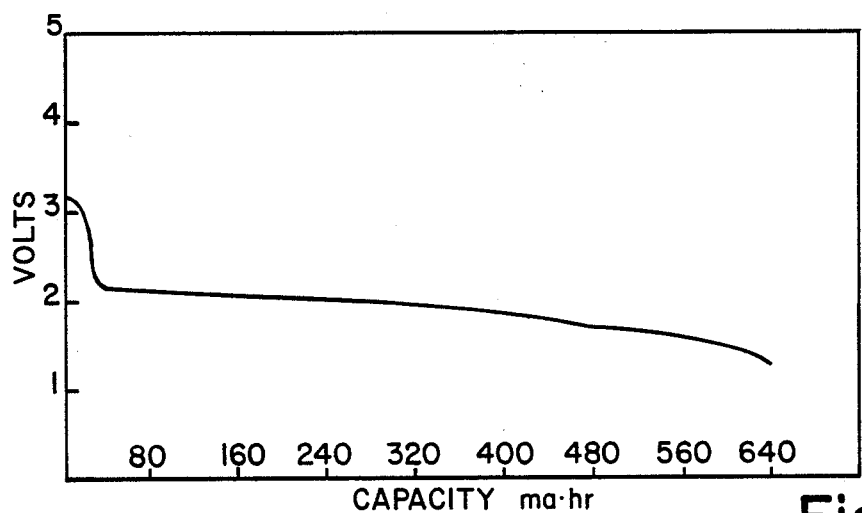

A cell as in Example 6 was made but with a 3 gram cathode comprised of 60% CuS, 30% graphite and 10% PTFE. The cell was discharged at 40 ma with results as shown in FIG. 7.

EXAMPLE 11

Figure 8:
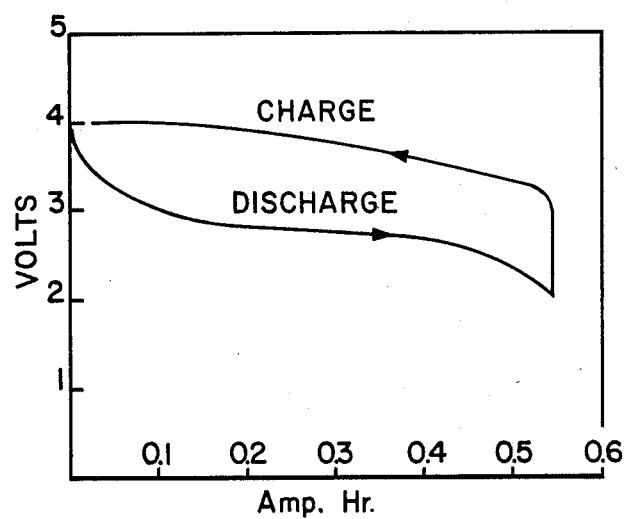
FIG. 8 is a graph of the polarization characteristics of a cell having an electrolyte of the present invention.

A spirally wound Li/MnO$_2$ cell having electrodes 6.25" (15.9 cm)×1" (2.5 cm) of lithium and MnO$_2$ with the cell being cathode limited to a theoretical capacity of 0.75 Ahrs was filled with the LiAlCl$_4$.3.1SO$_2$ electrolyte of Example 1. The cell showed an initial open circuit voltage of 4.0 volts. The cell was then discharged at 85 ma and delivered a capacity of 0.56 Ahr to a voltage cutoff of 2.0 volts. The cell was charged at 40 ma for 14 hours and discharged again at 40 ma delivering 0.40 Ah on the second discharge. FIG. 8 shows the polarization of the cell during discharge and charge.

Effective utilization of the low vapor pressure electrolyte of the present invention in Li/MnO$_2$ cells may alleviate problems relating to the reactive electrolyte salts and volatile solvents generally utilized in such electrochemical cell systems such as lithium perchlorate and dimethoxyethane by simply replacing them with the relatively safe electrolyte of the present invention.

From the above examples it is evident that the solvate-complex electrolytes of the present invention provide for substantially non-pressurized cells which are efficiently rechargeable and that some embodiments have conductivities well above those of previously known non-aqueous electrolytes which did not generally have room temperature conductivities above about $5 \times 10^{-2}$ ohm$^{-1}$cm$^{-1}$.

It is understood that the above examples are illustrative in nature and that changes in the cathode materials, electrolyte composition and ratios as well as the cell systems in which they are utilized may be made without departing from the scope of the present invention as defined in the following claims.

What is claimed is:

1. A non-aqueous, electrochemical cell having an active metal anode, a solid active cathode and a liquid electrolyte characterized in that said electrolyte consists essentially of a low vapor pressure, liquid solvate-complex of (a) sulfur dioxide annd (b) one or more alkali or alkaline earth metal salts soluble in said sulfur dioxide and also capable of forming a complex therewith, wherein said one or more salts consists essentially of a stoichiometric reaction product of a Lewis acid and a Lewis base, with the equivalent ratio of said one or more salts to $SO_2$ in said liquid electrolyte ranging from 1:1 to 1:7, and wherein all of said one or more alkali or alkaline earth metal salts is complexed with said sulfur dioxide.

2. The cell of claim 1 wherein said one or more salts contains Group 3A element halide anions.

3. The cell of claim 1 wherein one or more salts are selected from the group consisting of $LiAlCl_4$, $LiGaCl_4$, $LiBF_4$, $LiBCl_4$, $LiInCl_4$, $NaAlCl_4$, $NaGaCl_4$, $NaBF_4$, $NaBCl_4$, $NaInCl_4$, $Ca(AlCl_4)_2$, $Ca(GaCl_4)_2$, $Ca(BF_4)_2$, $Ca(BCl_4)_2$, $Ca(InCl_4)_2$, $Sr(AlCl_4)_2$, $Sr(GaCl_4)_2$, $Sr(BF_4)_2$, $Sr(BCl_4)_2$, $Sr(InCl_4)_2$, $Li_3SbCl_6$, $LiSbCl_6$ and mixtures thereof.

4. The cell of claim 1 wherein said solid active cathode is comprised of a material selected from the group consisting of metal halides, oxides, chromates, vanadates, titanates, tungstates, and chalcogenides, polyacetylene, poly-p-phenylene, polyphenylene sulfide, $C_xS$ and $Cf_n$.

5. The cell of claim 1 wherein said active metal anode is comprised of lithium.

6. The cell of claim 1 wherein said equivalent ratio ranges from 1:1 to 1:4.

7. The cell of claim 1 wherein said electrolyte is further comprised of an organic electrolyte which with said $SO_2$ is co-complexed with said one or more salts.

8. The cell of claim 1 wherein said cell further includes a minor amount of an inorganic additive selected from the group consisting of $SOCl_2$, $SO_2Cl_2$, $S_2Cl_2$, $SCl_2$ and mixtures thereof.

9. A low vapor pressure, non-aqueous electrochemical cell comprising a lithium anode, a solid active cathode and a liquid electrolyte consisting essentially of $SO_2$ complexed with one or more salts selected from the group consisting of $LiAlCl_4$, $NiAlCl_4$ and $Ca(AlCl_4)_2$ wherein the equivalent ratio of said one or more salts to $SO_2$ in said liquid electrolyte ranges from 1:1 to 1:4, with said one or more salts consisting essentially of stoichiometric amounts of $LiCl$, $NaCl$ and $CaCl_2$ with $AlCl_3$ respectively, and wherein all of said one or more salts is complexed with said sulfur dioxide.

10. The low vapor pressure electrochemical cell of claim 9 wherein said solid active cathode is comprised of a member selected from the group consisting of $CuCl_2$, $CuO$, $CuS$ and $MnO_2$.

11. The cell of claim 10 wherein said solid active cathode is comprised of $CuCl_2$.

12. A non-aqueous electrochemical cell comprising a lithium anode, a $CuCl_2$ cathode and a liquid electrolyte consisting essentially of $SO_2$ complexed with $LiAlCl_4$.

* * * * *